United States Patent [19]
Hanaoka et al.

[11] Patent Number: 4,684,257
[45] Date of Patent: Aug. 4, 1987

[54] MEASURING INSTRUMENT

[75] Inventors: Hiroshi Hanaoka; Sadayuki Matsumiya, both of Kawasaki, Japan

[73] Assignee: Mitutoyo Mfg., Tokyo, Japan

[21] Appl. No.: 693,658

[22] Filed: Jan. 22, 1985

[30] Foreign Application Priority Data

Feb. 2, 1984 [JP] Japan .................................. 59-17463
Feb. 2, 1984 [JP] Japan .................................. 59-17464

[51] Int. Cl.⁴ ............................................ G01B 11/14
[52] U.S. Cl. .................. 356/374; 33/125 C; 250/237 G
[58] Field of Search ...................... 356/374; 33/125 C; 250/237 G

[56] References Cited

U.S. PATENT DOCUMENTS

| | | | |
|---|---|---|---|
| 3,796,498 | 3/1974 | Post | 356/374 |
| 4,079,252 | 3/1978 | Brake | 356/374 |
| 4,442,607 | 4/1984 | Sakata et al. | 33/1 M |
| 4,459,749 | 7/1984 | Rieder et al. | 33/125 C |
| 4,564,294 | 1/1986 | Ernst | 33/125 C |

FOREIGN PATENT DOCUMENTS

| | | |
|---|---|---|
| 1031975 | 6/1966 | United Kingdom . |
| 1203597 | 8/1970 | United Kingdom . |
| 2095399 | 9/1982 | United Kingdom . |

Primary Examiner—R. A. Rosenberger
Attorney, Agent, or Firm—Flynn, Thiel, Boutell & Tanis

[57] ABSTRACT

The disclosure depicts a measuring instrument incorporating in relatively movable portions thereof optical type displacement detecting devices. Each of the optical type displacement detecting devices includes: a main scale having fringes constituted by reflecting portions and non-reflecting portions, both of which are lined up alternately; an index scale having fringes constituted by light transmitting portions and non-light transmitting portions, both of which are lined up alternately; a light emitting element for irradiating an index scale and a main scale; and a light receiving element for receiving light reflected by the main scale through the index scale to emit an electric signal corresponding to a relative displacement value between the both scales. The main scale is provided thereon with a disturbance preventing layer which absorbs light transmitted through the non-reflecting portions of the main scale not to allow the light to be reflected to the index scale.

3 Claims, 6 Drawing Figures

MEASURING INSTRUMENT

BACKGROUND OF THE INVENTION

1. Field of the Invention

This invention relates to measuring instruments, and more particularly to improvements in a displacement detecting device of a measuring instrument.

2. Description of the Prior Art

Such measuring instruments have been widely utilized in the industrial field that a measuring element supported in a manner to be movable in directions of three axes perpendicularly intersecting one another is brought into contact with a portion to be measured, and displacement values of the measuring element in the directions of the three axes in this case are detected by displacement detecting devices provided for the directions of the three axes, so as to measure dimensions, shape and the like of the portion to be measured.

In the measuring instrument of the type described, the performance of the displacement detecting device as well as the mechanical construction exert a great influence on the measuring accuracy, with the result that various detecting devices such as an optical type, an electromagnetical type and the like are selectively used with the measuring instruments of various types in accordance with the objects thereof.

Now, when the optical type one is adopted as the displacement detecting device, mainly due to the spatial restrictions, a long main scale is secured to a stationary side of the measuring instrument, a short index scale is mounted to a movable side, and a so-called reflection type optical displacement detecting device is generally adopted in such a manner that the device can move relative to the both scales and is provided thereon with a light emitting element and a light receiving element on the side of the index scale.

In adopting the reflection type displacement detecting device, heretofore, there have been many cases where metallic main scales are used. However, in the case of metallic ones, measurement with very high accuracy has been required from the measuring instruments, and, recently, necessity has been voiced for the large-sized ones, thus presenting the following disadvantages.

Namely, (1) it is very difficult to finish parallel and smooth flat surfaces with high accuracies whereby fringes may be affected. Particularly, the adverse influence is notable when the main scale is long. (2) When the main scale is fixed by the spot welding, distortions may be easily caused to the main scale. The distortions are notable when the main scale is long. (3) When the main scale is mounted to a stone surface plate and the like, the main scale may suffer from a distortion with age because the metal and the stone are greatly different in coefficient of thermal expansion from each other. (4) The fringes are formed by the etching method, whereby side etches become large, which is becoming not negligible from the viewpoint of the accuracy.

Now, these disadvantages have been overcome by making the main scale of glass. However, in this case, the following new problems have arisen.

Namely, in the reflection type one, a value of change in the reflected light obtained by the reflection of the fringes of the main scale is detected by a light receiving element. However, when the main scale is made of glass, the light transmitted through non-reflecting portions of the fringes has been reflected by a substance on the rear surface of the main scale (on the side opposite to the index scale) for example, and this reflected light has been received by the light receiving element. The influence of the reflection of the light transmitted through the above-mentioned non-reflecting portions (which is called a disturbance) is greatly influenced by the conditions of the rear surface of the main scale, namely, the conditions (optical property) of the reflecting surface when the light transmitted through the non-reflecting portion is reflected. As the result, an S/N ratio is fluctuated in various ways, thus giving an adverse influence to the measuring accuracy.

Now, in the coordinate measuring instrument, normally, main scales of displacement detecting devices are mounted such that a main scale for detecting in a direction of the X-axis is mounted on a guide member made of stainless steel, another main scale for detecting in a direction of the Y-axis is mounted on a stone surface plate, and a further main scale for detecting in a direction of the Z-axis is mounted on a spindle made of the other material. In consequence, when main scales made of glass are adopted, even if the displacement detecting devices identical with one another are mounted to one and the same coordinate measuring instruments, the reflected lights are varied in their intensities and modes from one another due to the differences in optical property of the portions to which the main scales are mounted, whereby it becomes necessary for the light receiving elements to be particularly adjusted.

There are some cases where the optical properties of the portions to which the main scales are mounted may change with age. In that case, even if the particular adjustments would be made, lowered accuracies could not be avoided. Moreover, there are many cases where it is unclear what adjusting method should be fitted for the optical property of the portions to which the main scales are mounted. In that case, it is impossible to make the adjustments.

SUMMARY OF THE INVENTION

The present invention has as its object the provision of a measuring instrument high in the measuring accuracy, and particularly, even when the instrument as a whole is enlarged in size, still high in the measuring accuracy.

To this end, the present invention contemplates that, as the displacement detecting devices in directions of the respective axes, so-called reflection type optical displacement detecting devices are adopted, main scales of the displacement detecting devices are made of a light transmitting material, a disturbance preventing layer is provided which absorbs light transmitted through non-reflecting portions of the main scale so as to not allow the light to be reflected to an index scale, whereby the light transmitted through the non-reflecting portions of the fringes of the main scale is absorbed so as not to affect a light receiving element, so that particular adjustment of the light receiving element can be dispensed with.

DETAILED DESCRIPTION OF THE PREFERRED EMBODIMENT

Description will hereunder be given of embodiments of the present invention with reference to the drawings.

Figure 1:
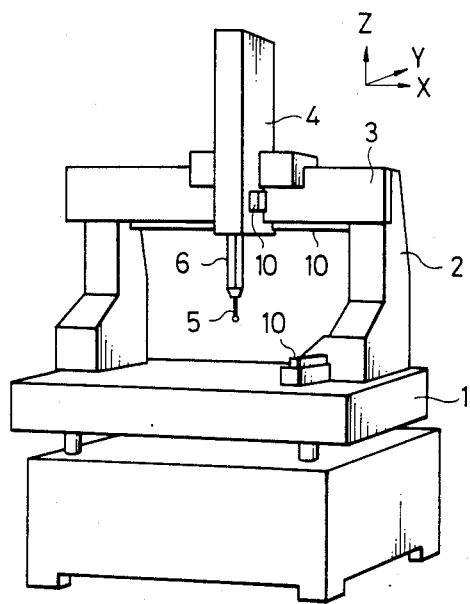
FIG. 1 is a perspective view showing the general arrangement of one embodiment of the measuring instrument according to the present invention.

FIG. 1 shows one embodiment of the measuring instrument according to the present invention. This measuring instrument is provided on the top face of a surface plate 1 functioning as a base thereof and having a gate-shaped frame 2 thereon movable back and forth (a direction of the Y-axis), a horizontal beam 3 on the gate-shaped frame 2 and having a slider 4 thereon movable in a lateral direction (a direction of the X-axis), and the slider 4 with having a probe shaft 6 with a measuring element 5 thereon movable in a vertical direction (a direction of the X-axis). In short, the measuring element 5 is provided in a manner to be movable in the directions of the three axes (three-dimensional directions). Furthermore, there are respectively provided optical type displacement detecting devices 10 between the surface plate 1 and the gate-shaped frame 2 as a Y-axis direction's position detecting device for detecting a displacement value of the gate-shaped frame 2 in the direction of the Y-axis, between the horizontal beam 3 and the slider 4 as an X-axis direction's position detecting device 10 for detecting a displacement value of the slider in the direction of the X-axis, and between the slider 4 and the probe shaft 6 as a Z-axis direction's position detecting device 10 for detecting a displacement value of the probe shaft 6 in the direction of the Z-axis. Displacement values of the measuring element 5 in the directions of the X, Y and Z axes are automatically detected by these detecting devices 10 and respectively displayed on an indicator or the like, not shown.

Figure 2:
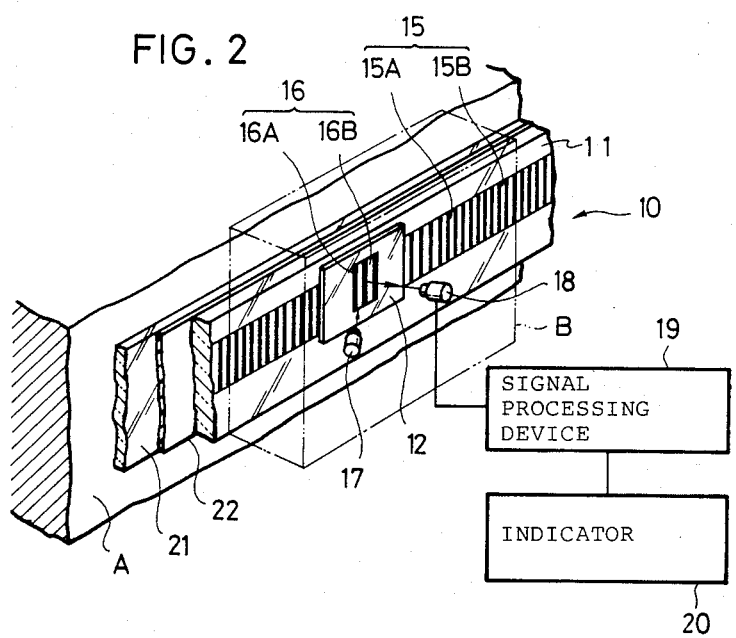
FIG. 2 is an enlarged perspective view showing the internal construction of the optical type displacement detecting device in the above embodiment.
Figure 3:
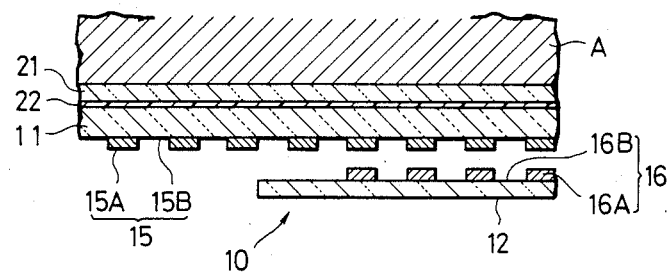
FIG. 3 is a sectional view showing the main scale and the index scale in the optical type displacement detecting device.

FIG. 2 shows the internal construction of the optical type displacement detecting device 10. Referring to the drawing, both of a long main scale 11 and a short index scale 12 are made of glass. Both the main scale 11 and the index scale 12, which are spaced a very small distance apart from each other, are disposed in the longitudinal direction of the main scale 11 in a manner to be movable relative to each other. Furthermore, the main scale 11 is fixed to a stationary member A, while, the index scale 12 is solidly secured to a movable member B. Herein, the surface plate 1 is the stationary member A and the gate-shaped frame 2 is the movable member B in the relation between the surface plate 1 and the gate-shaped frame 2. Furthermore, the horizontal beam 3 of the gate-shaped frame 2 is the stationary member A and the slider 4 is the movable member B in the relation between the horizontal beam 3 and the slider 4. Additionally, the slider 4 is the stationary member A and the probe shaft 6 is the movable member B in the relation between the slider 4 and the probe shaft 6.

Fringes 15 are depositedly formed on the front surface of the main scale 11 (the surface of the main scale on the side of the index scale) in the longitudinal direction of the main scale 11. These grating fringes 15 are constituted by reflecting portions 15A and non-reflecting portions (namely, portions where the reflecting portions 15A are not deposited) 15B, both of which have widths equal to each other and line up alternately.

On the other hand, fringes 16 are also formed on the index scale 12. These fringes 16 are constituted by light transmitting portions 16a and non-light transmitting portions 16B, both of which have pitches equal to each other. Additionally, two fringes 16 of the index scale 12 are provided in a manner to be shifted by ¼ pitch, so that the directional property of the index scale 12 can be discriminated.

A light emitting element 17 and a light receiving element 18 are provided at predetermined positions on the side of the index scale 12 in the slider 4. A light irradiated from the light emitting element 17 at a predetermined angle to the fringes 16 of the index scale 12 is transmitted through the light transmitting portions 16A of the fringes 16, thereafter, reflected by the main scale 11, transmitted through the light transmitting portions 16A of the fringes 16 of the index scale 12 again, and adapted to be received by the light receiving element 18. The light receiving element 18 is connected thereto with a signal processing device 19 and an indicator 20, whereby a displacement value (displacement in quantity of light) of the reflected light is processed by the signal processing device 19, and thereafter, displayed on the indicator 20 as a relative displacement value between the both scales 11 and 12.

A glass plate 21 other than the main scale 11 is disposed close to the rear surface of the main scale 11 (on the side opposite to the index scale 12), and the main scale 11 is mounted to the stationary member A through this glass plate 21.

A disturbance preventing layer 22 is provided on the side surface of the glass plate 21 on the side of the main scale 11. This disturbance preventing layer 22 is formed of a film of a light absorbing material, which is deposited onto the side surface of the glass plate 21. The glass plate 21 absorbs the light transmitted through the non-reflecting portions 15B of the main scale 11 so as not to generate reflected light on the side of the index scale 12.

According to this embodiment as described above, the following advantages can be offered.

Works with high accuracy can be easily performed, the change with age is low and no distortion is generated in mounting, so that, even when the measuring instrument is large-sized, no distortion is generated in the main scales 11, high precision measurement can be performed.

Furthermore, the disturbance preventing layer 22 is disposed on the rear surface (on the side opposite to the index scale 12) of the main scale 11, so that the light transmitted through the non-reflecting portions 15B of the fringes 15 of the main scale 11 is not reflected to the index scale 12, or is made to be the predetermined (of a known property) reflected light and reflected to the index scale 12. Because of this, no noises are generated at the light receiving element 18, or a predetermined quantitative correction is performed at the signal processing device 19, so that an accurate (high precision) displacement detection can be performed at all times. In other words, the measured value is not influenced by the optical property of the stationary member A as being the portions, to which the main scale 11 is mounted.

Further, it is only enough to mount the main scale 11 to the stationary member A through the glass plate 21 provided thereon with the disturbance preventing layer 22, so that the mounting can be easily performed.

Figure 4:
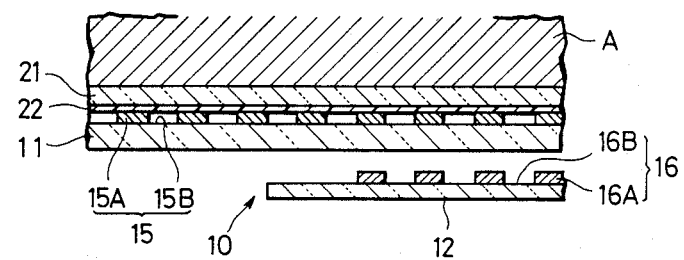
FIGS. 4 to 6 are sectional views showing the main scale and the index scale in other embodiments different from one another.
Figure 5:
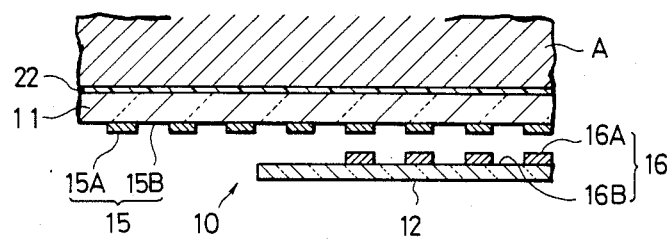
Figure 6:
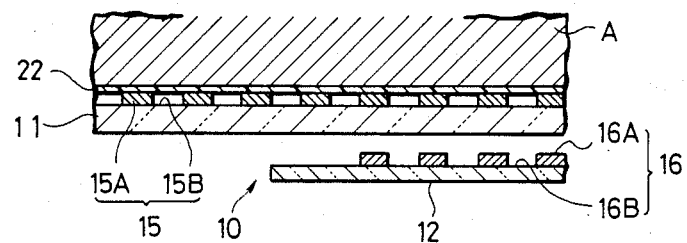

Additionally, in working, the fringes 15 of the main scale 11 may be faced to the stationary member A (on the side opposite to the index scale 12) (Refer to FIG. 4). In this case, such an advantage is offered that, when the stationary member A is deformed, the influence exerted on the main scale 11 by the expansion or shrinkage of the stationary member A due to the deformation is low. Furthermore, the disturbance preventing layer 22 may be directly depositedly formed on the rear surface of the main scale 11 (Refer to FIG. 5). Additionally, after the disturbance preventing layer 22 is directly formed on the stationary member A, the main scale 11 may be mounted (Refer to FIG. 6).

Further, the disturbance preventing layer 22 is made of the black coating film, the light absorbing material being a synthetic resin characteristic such as a metallic deposited film so as to prevent the dark portion from becoming a bright portion. In the case of using the metallic deposited film, it is preferable that the main scale 11 is closely attached to the portions to be mounted in order to make the disturbance preventing layer 22 have a uniform thickness.

Furthermore, the displacement detecting devices mounted in the directions of the respective axes need not necessarily be identical with one another.

As has been described hereinabove, the present invention can provide a measuring instrument high in the measuring accuracy, and particularly, even when the instrument as a whole is enlarged in size, still high in the measuring accuracy.

What is claimed is:

1. A measuring instrument provided therein with two or more optical type displacement detecting devices each including:
   a main scale having fringes constituted by reflecting portions and non-reflecting portions, both of which are lined up alternately;
   an index scale having fringes constituted by light transmitting portions and non-light transmitting portions, both of which are lined up alternately;
   a light emitting element provided on the side of said index scale for irradiating said index scale and said main scale; and
   a light receiving element for receiving light reflected by said main scale through said index scale to emit an electric signal corresponding to a relative displacement value between said both scales;
   wherein the respective main scales of said optical type displacement detecting devices are made of a glass light transmitting material and the respective main scales are each provided with a disturbance preventing layer made of a film of a light absorbing material which absorbs a light transmitted through said non-reflecting portions of said main scales so as to not allow the light to be reflected to said index scales; and
   wherein a glass plate is disposed on the side of said main scale opposite to said index scale and said disturbance preventing layer is provided on the side surface of said glass plate facing said main scale.

2. A measuring instrument as set forth in claim 1, wherein there are provided three optical type displacement detecting devices perpendicularly intersecting one another, for detecting displacements in directions of three axes and said disturbance preventing layers are made of materials identical with one another.

3. A measuring instrument comprising: a frame provided in a manner to be movable in a Y direction on a surface plate; a slider provided on said frame in a manner to be movable in an X direction; a measuring element provided on said slider and supported in a manner to be movable in a Z direction; three optical type displacement detecting devices provided on portions movable relative to one another in said X, Y and Z directions perpendicularly intersecting one another, each of said optical type displacement detecting devices including a main scale having fringes constituted by reflecting portions and non-reflecting portions, both of which are lined up alternately, an index scale having fringes constituted by light transmitting portions and non-light transmitting portions, both of which are lined up alternately, a light emitting element provided on the side of said index scale for irradiating said index scale and said main scale, and a light receiving element for receiving light reflected by said main scale through said index scale to emit an electric signal corresponding to a relative displacement value between the both scales;
   wherein said main scales are made of a light transmitting material, said main scales are mounted on glass plates, disturbance preventing layers are provided between said glass plates and said main scales, respectively, and each of said disturbance preventing layers is formed of a film of a light absorbing material so that said disturbance preventing layer absorbs a light transmitted through said non-reflecting portions of said main scale so as to not allow the light to be reflected to said index scale.

* * * * *